United States Patent [19]

Melde

[11] 3,871,097

[45] Mar. 18, 1975

[54] COOLING SYSTEM FOR A DENTAL HANDPIECE

[76] Inventor: Chris R. Melde, 7007 3rd Avenue, Scottsdale, Ariz. 85251

[22] Filed: Nov. 5, 1973

[21] Appl. No.: 412,759

Related U.S. Application Data

[63] Continuation-in-part of Ser. No. 272,202, July 17, 1972, Pat. No. 3,778,904.

[52] U.S. Cl. ................................................ 32/27
[51] Int. Cl. ............................................ A61c 1/10
[58] Field of Search ............... 32/26, 27, 28, 48, 59; 415/503

[56] References Cited
UNITED STATES PATENTS

| 3,141,650 | 7/1964 | Saffir | 32/27 |
| 3,624,905 | 12/1971 | Barsby | 32/48 |
| 3,778,904 | 12/1973 | Melde | 32/27 |

Assistant Examiner—J. Q. Lever
Attorney, Agent, or Firm—Cahill, Sutton & Thomas

[57] ABSTRACT

A dental handpiece, including a handle, a shank and a head, is disclosed for conveying a cooling stream of air to a workpiece. An air driven turbine mounted within the head serves as the motive means for a hollow burr and includes a hollow rotor for receiving the shaft of the burr. A stream of air is conveyed through a passageway in the dental handpiece into a collection chamber within the head adjacent the turbine. Because of the air pressure buildup within the collection chamber, a flow of air is forced through the hollow rotor and into the hollow burr. Thence, the air flows through the burr to the working portion thereof and cools the working portion as well as the workpiece in proximity to the working portion. A chuck for securing the burr to the rotor and a tool for use with the chuck are also disclosed.

13 Claims, 9 Drawing Figures

COOLING SYSTEM FOR A DENTAL HANDPIECE

The present application is a continuation-in-part application of an application entitled "COOLING SYSTEM FOR A DENTAL HANDPIECE," assigned Ser. No. 272,202, filed on July 17, 1972, now U.S. Letters Pat. No. 3,778,904 and describing an invention invented by the present inventor.

The present invention relates to dental handpieces, and more particularly, to dental handpieces incorporating a coolant flowing through the burr to a workpiece.

Dental handpieces are generally used to perform both grinding and cutting operations upon a workpiece. Either of these operations generate a substantial amount of heat. Where the workpiece is a tooth or a filling within a tooth in a patient's mouth, the heat generated may be painful as well as uncomfortable. Where the dental handpiece is used upon workpieces outside of a patient's mouth, such as braces, dentures, and splints, the heat generated may deleteriously affect the materials being worked upon.

To circumvent the problems attendant the generated heat, various means have been developed to reduce or dissipate the generated heat. In one type of an air-driven handpiece, water is pumped through the dental handpiece, into a hollow burr and flows from the working portion thereof onto the workpiece. The use of water is satisfactory in several respects in that it is easily obtainable, requires no special containers and does not quickly corrode the working elements of the dental handpiece if properly channeled. However, two major problems exist when water is used. First, the channeling of the water from the dental handpiece and into the hollow burr requires specially designed elements to prevent the water from entering the bearings supporting the rotating burr and removing or limiting the effectiveness of the bearing lubricant. Second, although the water does not usually affect the properties of the workpiece, the presence of water, whether in liquid form or as a mist, tends to obscure the workpiece from view. Thereby, the amount of work that can be performed by the burr is limited by required periodic mopping or draining of the water.

A coolant such as air does not present quite the same problems as water, but there are other attendant difficulties. To inject a flow of air into a hollow burr, various coupling devices have been developed to channel the air from a non-rotating part within the head to the rotating hollow burr. One of the most common of these couplings is that of mounting a conduit adjacent the head of the dental handpiece with the nozzle in axial alignment with the hollow burr. A stream of air is forced through the conduit and the nozzle and into the hollow portion of the burr. A disadvantage of this type of coupling is that presently used and available dental handpieces must be substantially and expensively modified to incorporate the conduit and nozzle.

In another type of coupling, the hollow burrs are modified by adding one or more radial passageways between the hollow portion of the burr and the cylindrical surface of the burr. The head of the dental handpiece must be modified to include a collection chamber in communication with the radial passageways. The primary disadvantage of the latter coupling is that there is at best an inefficient flow of air through the radial passageways into the hollow portion of the burr and thence to the working portion of the burr. Centrifugal forces act upon the air attempting to flow through the radial passageways and establish a back pressure. In addition, the abrupt change in direction of flow of the air from the radial passageway to the hollow portion of the burr causes a pressure drop, which pressure drop reduces the rate of flow. The non-working end of the hollow burr must, of course, be sealed to prevent air flow therethrough rather than through the working portion. The resultant seal invariably leaves a small air chamber intermediate the radial passageways and the seal itself. A pressure buildup tends to occur within this chamber and further inhibits the flow of air from the radial passageways into the hollow portion of the burr. Thus, the above-described coupling is mechanically simple and relatively inexpensive to incorporate but has adverse effects on the effectiveness of the flow through the hollow burr.

It is therefore a primary object of the present invention to provide apparatus for conveying a stream of air through a hollow burr within a dental handpiece.

Another object of the present invention is to provide apparatus which may be incorporated in existing dental handpieces for conveying a stream of air through a hollow burr.

Yet another object of the present invention is to provide a means for coupling an air flow source within the head of a dental handpiece to the end of a hollow burr.

A further object of the present invention is to provide a coupling between an air flow source and a hollow burr, which coupling does not require substantial modification of the heads of existing dental handpieces.

A yet further object of the present invention is to provide a chuck for retaining a hollow burr within a hollow rotor of a turbine.

A still further object of the present invention is to provide a tool for receiving a hollow burr within a chuck extending from the rotor of a turbine in a dental handpiece.

These and other objects of the present invention will become apparent to those skilled in the art as the description thereof proceeds.

The present invention may be described with more specificity and clarity with reference to the following drawings, in which.

Figure 1:
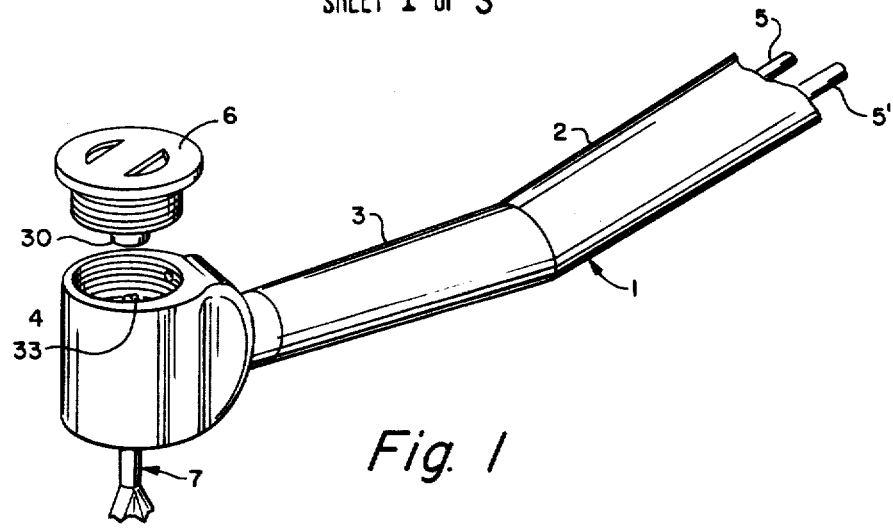
FIG. 1 illustrates a dental handpiece.

Referring to FIG. 1, there is shown a dental handpiece 1, representative of presently available and used dental handpieces. The dental handpiece 1 includes a handle 2 for gripping the dental piece and a shank 3 for securing the cylindrically shaped head 4 to the handle at a comfortable angle. Head 4 houses an air turbine which rotatably drives a hollow burr 7. A plurality of air tubes 5 extend through handle 2 and shank 3 to head 4, one of which, when connected to an air pressure source, drives the turbine. Another of the tubes 5 provides a source of air flow to head 4, which air flow is conveyed through hollow burr 7, as will be explained in more detail below. A cap 6, threadedly secured within head 4, is similar in external dimensions to existing caps and acts as a replacement therefor. Cap 6 seals one end of the cylindrical cavity disposed within head 4.

Figure 2:
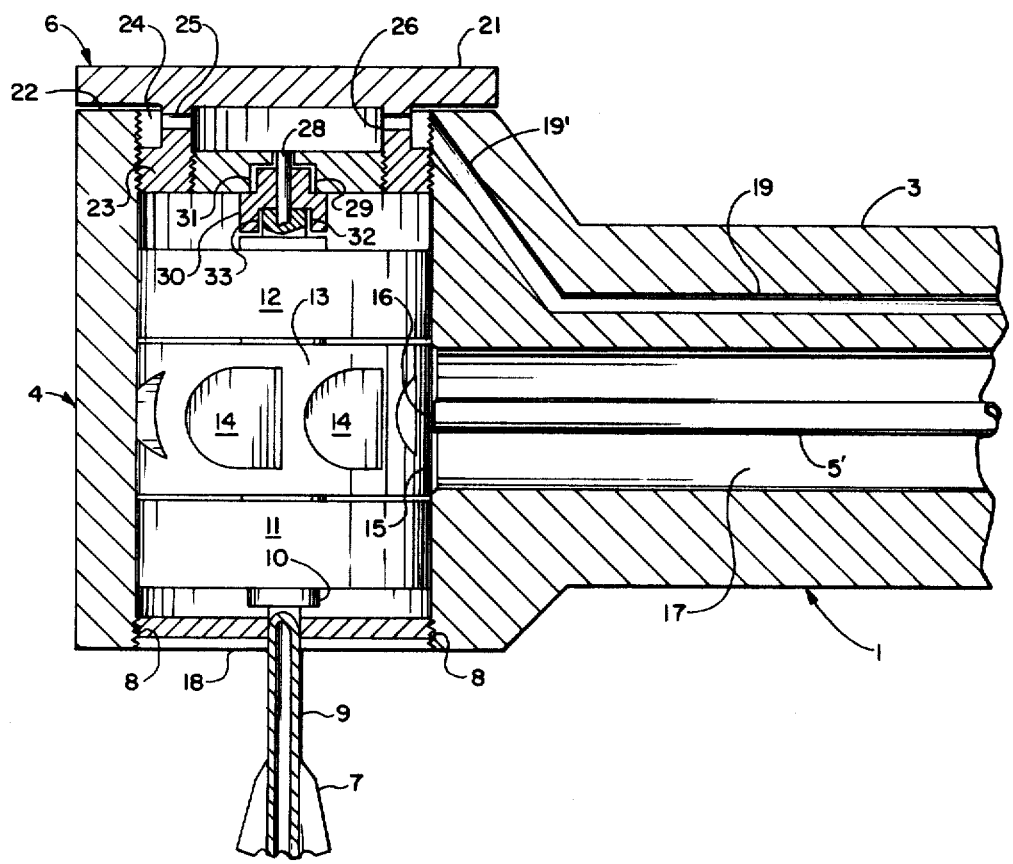
FIG. 2 illustrates a cross-sectional view of the head of a dental handpiece.

Referring to FIG. 2, there is shown a detailed cross-sectional view of head 4, cap 6 and a part of shank 3. Head 4 is generally cylindrical and normally secured to shank 3 in a right angled relationship. A cylindrical cavity, defined by side wall 8, is axially disposed within head 4.

Shank 9 of burr 7 is frictionally fitted within a hollow shaft 10. The relationship between burr 7 and shaft 10 should be such that the burr may be removed and inserted within the shaft without undue physical strain, yet provide sufficient friction therebetween, whereby rotation of the shaft will cause the burr to rotate. Shaft 10 is positioned within the cylindrical cavity in head 4 by two rotary bearings 11 and 12. These bearings may be of any of several different types; however, it has been found that caged ball bearings rotating within an inner and an outer race have proven quite satisfactory. Disposed between ball bearings 11 and 12 and frictionally fitted to shaft 10 is an air turbine 13.

The configuration of turbine 13 may be of any one of several known types; however, a cofiguration which is particularly suitable for dental handpieces is that known as bucket turbine. That is, the cylindrical surface of turbine 13 has a plurality of depressions or buckets 14 radially disposed therein. A stream of fluid, striking these buckets 14, imparts a force, which force causes the turbine to rotate or spin.

The stream of fluid, which is usually an air stream, is introduced to the dental handpiece through one of the tubes 5 in handle 2. The air stream flows within the tube 5' through handle 2 and shank 3 to orifice 15 disposed in side wall 8. The air stream flows out of orifice 15 and strikes buckets 14. Rotation of turbine 13 is effected by the force of the stream of air striking the buckets 14.

The inflowing air, operating upon turbine 13, flows circumferentially about the turbine to an inlet 16. Inlet 16 is disposed within side wall 8 and represents the inlet to exhaust passageway 17. Exhaust passageway 17 extends through shank 3 and handle 2. In this manner, the exhaust air is conveyed away from the head 4.

In the standard dental handpieces, the cylindrical cavity within the head is generally partially enclosed at the lower end by an apertured circular plate, such as plate 18 threadedly engaging side wall 8, and sealed at the upper end by a cap, such as cap 6 threadedly engaging side wall 8.

In the present invention, apparatus is disclosed, which, when used in conjunction with a simple modification to the handle 2, shank 3 and head 4, permits the directing of a stream of air through hollow burr 7 to the workpiece. The handle 2, shank 3 and head 4 are modified to include a passageway 19 extending therethrough. Generally, the major modifications to dental handpieces is that of drilling a passageway 19' from the upper part of head 4 to the junction between head 4 and shank 3. The remaining portion of passageway 19 may comprise a piece of tubing secured to the drilled passageway 19' and lodged within shank 3 and handle 2. One of the tubes 5 (as shown in FIG. 1) is representative of the tube defining passageway 19 extending from handle 2. The upper end of drilled passageway 19' communicates with the cylindrical cavity within head 4 in proximity to the upper portion of internal threads 20, the latter being disposed within side wall 8.

Cap 6 includes a radial flange 21 for sealably engaging upper surface 22 of head 4. A hollow threaded boss 23 of cap 6 engages threads 20, whereby cap 6 can be screwed into and out of head 4. A recess 24 is disposed about boss 23 immediately adjacent radial flange 21. When cap 6 is secured within head 4, recess 24 is aligned with the orifice of passageway 19'. A plurality of radial passageways 25 extend from recess 24 to the hollow portion within boss 23. The internal side wall 26 of boss 23 is at least partially threaded to threadedly receive an apertured circular plate 27. Aperture 28 of plate 27 is centrally disposed therein and in approximately axial alignment with hollow burr 7. Thus, an air collection chamber is formed within cap 6 by the combination of hollow boss 23 and plate 27.

An axially oriented circular recess 29 is disposed within plate 27 and faces the end of burr 7. A coupling 30, includes a protrusion 31, the latter fitting within recess 29, and a central recess 32, the latter fitting about the end 33 of burr 7. A passageway 34 extends through the coupling from protrusion 32 to recess 32. It has been found through experimentation that the best results may be obtained if coupling 30 is of somewhat flexible resilient material. The flexible and resilient features permit some degree of misalignment between recess 29 and end 33 of burr 7 without seriously affecting the operation of the dental handpiece.

In operation, the present invention may be described as follows. A stream of air, introduced to the dental handpiece through one of tubes 5, flows through tube 5' and strikes each of the buckets 14 in order. The force of the air flow causes turbine 13 to rotate, which rotation in turn rotates burr 7. The air flows partially about turbine 13 to inlet 16 of exhaust passageway 17. Simultaneously, another of tubes 5 provide an air flow input to passageway 19. The air flows through passageways 19 and 19' to the annular cavity defined by recess 24 and threads 20. As pressure builds up within this annular cavity, the air will flow through passageways 25 into the hollow portion of boss 23. In turn, the air pressure will build up within the boss 23 until the air flows out through aperture 28. Passageway 34, being aligned with aperture 28 due to the mating of protrusion 31 within recess 29, further directs the air flow from within cap 6. Hollow burr 7 is aligned with passageway 34 by the mating of end 33 with recess 32. Thus, the air flowing into the hollow portion of cap 6 will flow out therefrom through aperture 28, through passageway 34 and into the hollow portion of burr 7. There will, of course, be some leakage intermediate cap 6 and coupling 30 as well as between coupling 30 and burr 7 as these points of contact are not specifically intended to be wholly airtight. The points of contact are simply snug but yet not so snug as to cause undue friction between the non-rotating elements and the rotating burr. The amount of air leakage is, at most, a small percentage of the total air flow and thus, does not seriously or deleteriously affect the total air flow through burr 7 to the workpiece. The total amount of air flow can, of course, be regulated by regulating means secured to either tubes 5 or a valve disposed within passageway 19.

As discussed above, the above-described means for effecting an air flow through a hollow burr can be incorporated into most presently used dental handpieces without extensive or expensive modifications. The axial length of the cap 6 and coupling 30 must, of course, be suitably tailored to fit within the various sized heads so as not to require displacement of a turbine nor of its associated air stream. As most presently used heads are of solid material except for the inlet and exhaust passageways for the turbine, substantial latitude is available in the alignment and drilling of passageway 19'. The handle and shank of most dental handpieces are generally hollow, thus, passageway 19 can simply be a piece of copper tubing secured to one end of passageway 19' and extending through shank 3 and handle 2.

Figure 3:
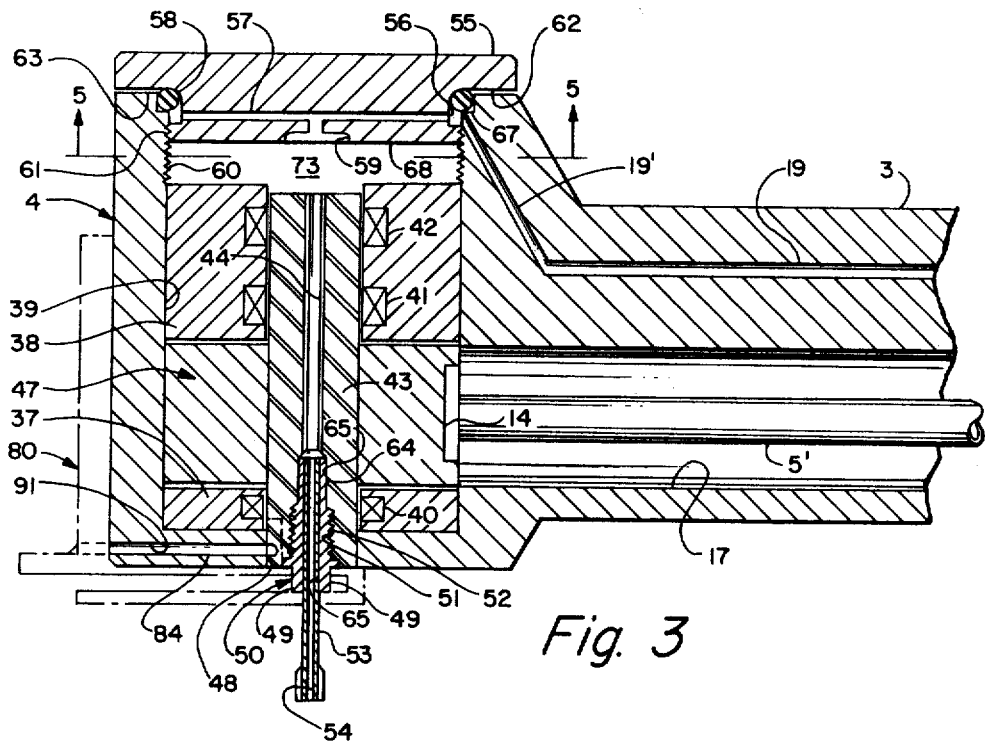
FIG. 3 illustrates a cross-sectional view of the head of a dental handpiece incorporating the present invention.
Figure 9:
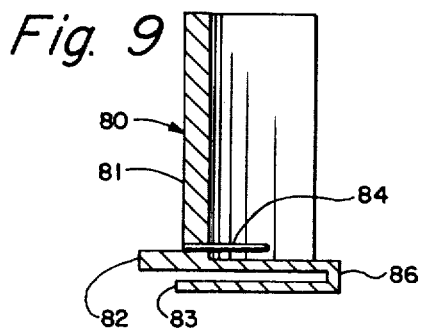
FIG. 9 illustrates a cross-sectional view of the tool taken along lines 9—9, as shown in FIG. 8.
Figure 7:
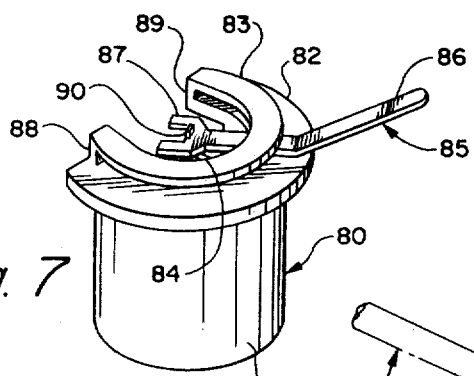
FIG. 7 illustrates a perspective view of a tool for tightening and loosening the chuck shown in FIG. 4.

Referring to FIG. 3, there is shown a modification of the present invention. The modification permits the use of short length hollow burrs with a resulting savings in operating cost without derogating or diminishing the effectiveness of the stream of air passing through the burr.

One end of the cylindrical cavity within head 4, defined by cylindrical wall 39, is sealed by a cap 55. The cap includes a radial shoulder 62, which shoulder mates with annular surface 63 of head 4. Threads 61 of a threaded stud 68 engages threads 60 disposed within cylindrical wall 39. An annular recess 56 extends about stud 68 generally adjacent the lower surface of flange 62 and serves two purposes. First, it positions an O-ring 58 to provide a seal between cap 55 and a seat 67 of head 4 as the cap is threaded onto the head. Second, it is in communication with the outlet orifice of passageway 19' whereby the air flowing through the passageway is admitted into the recess.

Figure 5:
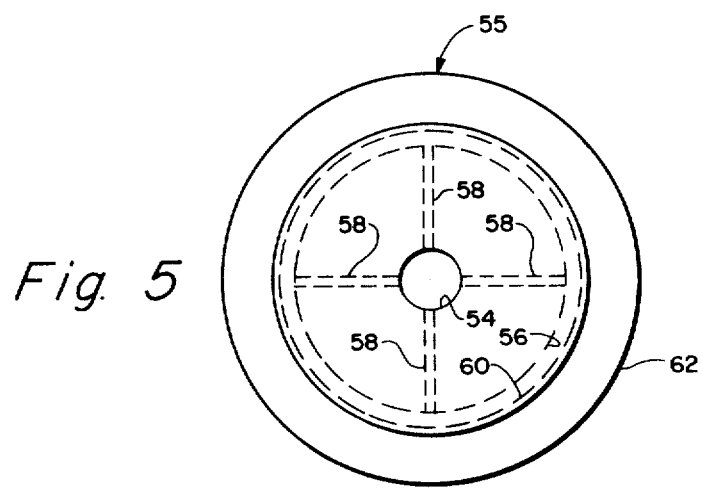
FIG. 5 illustrates the cap shown in FIG. 3.

A plurality of radial passageways 58 extend inwardly from recess 56 to a centrally disposed cavity 59 in cap 55 (see FIG. 5). Thereby, the air flowing through passageway 19' into recess 56 is directed into cavity 59.

After cap 55 has been firmly secured to head 4, a chamber 73 is formed intermediate the end of stud 68 and a bearing support 38 within the head. Bearing support 38 includes bearings 41 and 42 for engagement with a centrally disposed hollow rotor shaft 43. A further bearing support 37 is disposed at the lower end of head 4 and includes further bearings 40 which bearings also support rotor shaft 43. A turbine assembly 47 is fixedly secured to rotor shaft 43 intermediate bearing supports 37 and 38. The turbine assembly 47 includes a plurality of buckets, of which bucket 14 is shown in cross-section, responsive to a flow of air emanating from air tube 5'. An enlarged passageway 17 may surround air tube 5' to convey the exhaust air from turbine assembly 47.

The lower end of head 4 includes a centrally apertured flange 45 extending thereacross. Aperture 46 is of sufficient diameter to receive, in a non-contacting relationship, the lower end of rotor shaft 43. Radial flange 45 serves as a positioning mechanism for bearing assembly 37, which bearing assembly, in combination with bearing assembly 38, axially positions rotor shaft 43.

A central passageway 44 extends through the axis of rotor shaft 43. One end of central passageway 44 communicates with the chamber 73 while the other end is internally threaded with threads 51 to receive a similarly threaded chuck 50. In addition, the lower end of central passageway 44 includes a tapered passageway 54.

Figure 6:
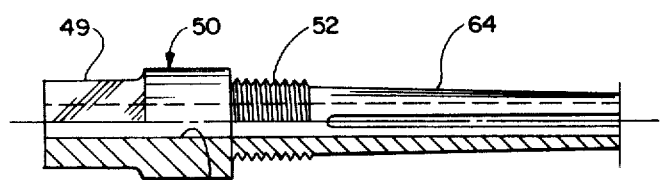
FIG. 6 illustrates a chuck for retaining a hollow burr.

In describing the construction and operation of chuck 50, reference will also be made jointly to FIGS. 3, 5 and 6. An axial cavity 66 extends through chuck 50 and is of a diameter approximately equal to the diameter of burr 53. The lower end of chuck 50 includes a bolt head 49 to permit gripping of the chuck with a small hand tool. Immediately adjacent the bolt head 49, there exists a cylindrical section, such as cylinder 69, which is disposed within an expanded diameter section of central passageway 44. Threads 52, engage similar threads 51 formed within central passageway 44. The end of chuck 50 is formed as a tapered split sleeve 64 to mate with the tapered section 65 of central passageway 44.

In operation, chuck 50 is initially in a partially threaded engagement with rotor shaft 43. After burr 53 has been inserted within axial cavity 66 as far as it will go, chuck 50 is turned with respect to rotor shaft 43 by means of a tool applied to bolt head 49. By rotating chuck 50, the threads thereof will draw the chuck into rotor shaft 43. As chuck 50 is axially displaced, the split sleeve 64 will engage tapered section 65. The latter will force an inward lateral displacement of the arms of the split sleeve 64 until burr 53 is firmly engaged by the split sleeve. The burr is removed from the chuck by reversing the above steps.

The operation of the present invention may be summarized as follows. An air pressure buildup is generated within chamber 73 by the air flowing through passageway 19', recess 56, passageways 58 and into the chamber via cavity 59. The resulting air pressure within the chamber will force a flow of air through central passageway 44 into axial cavity 66 of chuck 50 and thence through axial passageway 54 of burr 53. Thereby, a flow of air is directed to the workpiece in proximity to the working tip of the burr.

Figure 4:
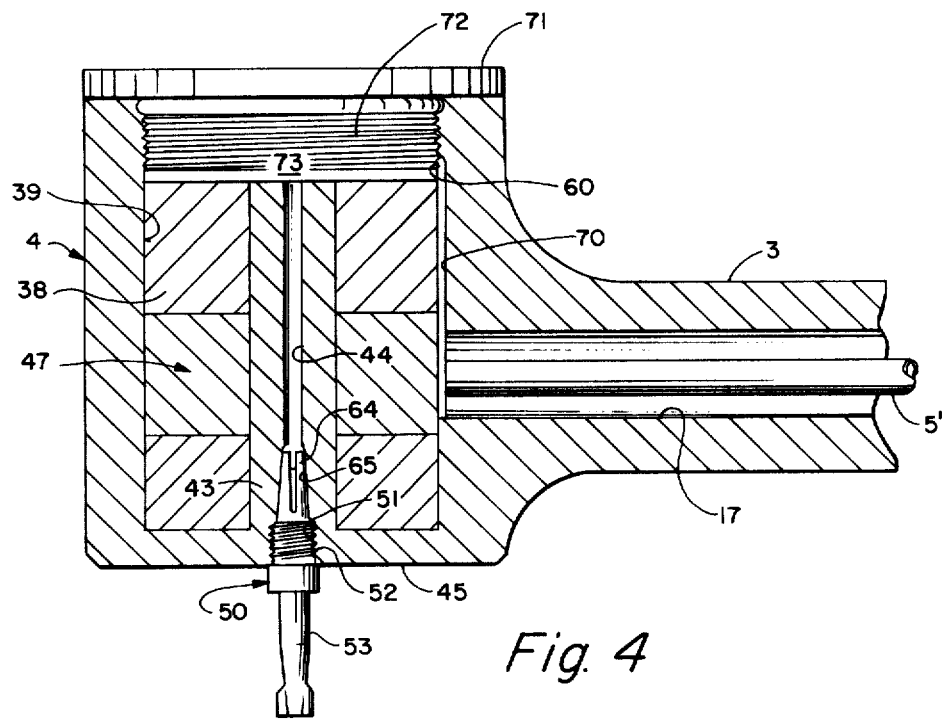
FIG. 4 illustrates a cross-sectional view of a modification of the head shown in FIG. 3.

Referring to FIG. 4, there is shown a yet further modification of the present invention. In an effort to reduce the cost of dental handpieces incorporating the present invention, the air passageways 19 and 19' have been eliminated. The specially constructed caps 6 (see FIG. 2) and 55 (see FIG. 3) have been replaced by a solid cap 71 having a threaded stud 72 engaging threads 60 of head 4.

The inlet air passageway 5' is tapped by means of a longitudinally configured groove 70 disposed within cylindrical wall 39. The groove extends upwardly from passageway 5' and communicates with chamber 73, which chamber is formed intermediate bearing assembly 38 and stud 72. Thereby, a part of the air flowing through passageway 5 is bled off through groove 70 to generate a source of air pressure within chamber 73.

The air pressure within chamber 73 is relieved by a flow of air from the chamber through passageway 44 and the interconnecting passageway within burr 53. Thereby, a flow of cooling air is directed to the workpiece through the burr.

Lateral flow of air from within groove 70 is essentially inhibited by the bearing assembly 38 contacting the cylindrical surface 39 adjacent either side of groove 70. Although the seal adjacent the lateral sides of groove 70 may not be completely air tight, it has been found in practice that some leakage is tolerable. In fact, it has been found that in some instances there is an upwardly directed air leakage from about the turbine assembly 47. Thus, the air leakage attendant groove 70 may be into the groove rather than out of it. The true flow of air will, of course, be dependent upon the relative pressures within and adjacent to the groove.

A chuck 50 may be mounted within rotor 43 in the embodiment illustrated in FIG. 4, to receive and retain the burr 53, as described above.

In order to permit rapid and facile insertion and removable of burrs 53 from within chuck 50, a tool has been developed for this purpose. This tool will be described with joint reference to FIGS. 3, 7, 8 and 9. Tool 80 includes a semi-circular cylindrical skirt 81 to receive a part of head 4. One end of skirt 81 is capped by an annular flange 82. A curved guide 83 is secure to flange 82 but axially spaced therefrom by means of spacers 88. A pin 84 is secured to and extends radially inwardly from skirt 81. A wrench 85, including a handle 86 and an open ended head 87, is slidably disposed intermediate flange 82 and guide 83. A stop 90, extending upwardly from head 87, prevents the head from being withdrawn intermediate the flange and the guide. Thereby, wrench 85 may pivot about head 87 when the latter is aligned with the longitudinal axis of skirt 81 but the wrench cannot be physically disassociated from tool 80.

Figure 8:
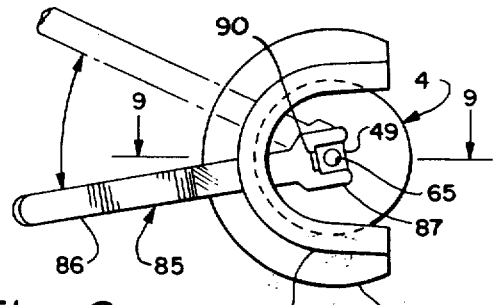
FIG. 8 illustrates a top view of the tool shown in FIG. 7.

The operation of tool 80 will be described primarily with reference to FIGS. 3 and 8. Tool 80 is attached to head 4 by inserting pin 84 into cavity 9, which cavity is radially disposed within flange 45. The rotor shaft 43 is rotated until the pin slides into recess 48 in rotor shaft 43. With the pin 84 inserted within recess 48 it will be apparent that further rotation of rotor shaft 43 with respect to head 4 is prevented and the rotor shaft will be in a locked position. The length of pin 84 is configured such that when the pin is fully inserted, skirt 81 will be adjacent the periphery of head 4.

Chuck 50 is loosened or tightened within rotor shaft 43 by wrench 85. Head 87 of tool 85 is placed in engagement with bolt head 49 of the chuck. By rotating handle 86 in the clockwise or counter clockwise direction, the chuck 50 is threaded into or out of rotor shaft 43. The resulting axial displacement of chuck 50 will cause the split sleeve 64 to radially contract under force of the tapered section 65 or expand under force of the resilient nature of the split sleeve, depending upon whether the chuck is axially displaced into or out of the rotor shaft. Thus, tool 80 may be used to loosen or tighten the grip of chuck 50 or burr 53.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. In a dental handpiece having a handle, a shank, a head including a cylindrical cavity therein, an air operated turbine assembly disposed within the cavity, the turbine assembly including a hollow rotor in communication with one end of the turbine assembly and a hollow burr engaged to the one end of the hollow rotor and extending from one end of the head, the improvement comprising in combination:
   a. conveying means for transporting a flow of air to the head;
   b. a cap secured to the other end of the head for sealing one end of the cylindrical cavity;
   c. a collection chamber disposed within the cylindrical cavity, said collection chamber being defined by the cylindrical wall of the cylindrical cavity, said cap and said one end of the turbine assembly; and
   d. transmission means for transmitting a flow of air from said conveying means to said collection chamber; whereby, the air transmitted to said collection chamber establishes an air pressure buildup within said collection chamber to force a flow of air into the hollow rotor and through the hollow burr to cool the working section of the hollow burr and the workpiece.

2. The improvement as set forth in claim 1 wherein said cap comprises:
   a. a flange for engagement with said other end of the head;
   b. a stud threadedly mounted within the cylindrical wall of the cylindrical cavity;
   c. an annular recess disposed within said stud in proximity to said flange;
   d. a cavity disposed within the end of said stud; and
   e. at least one passageway extending within said stud from said recess to said cavity.

3. The improvement as set forth in claim 2 wherein said conveying means terminates at an orifice disposed in the wall of the cylindrical cavity in proximity to said recess; whereby, a flow of air is channeled from said conveying means to said collection chamber through said stud.

4. The improvement as set forth in claim 3 including an O-ring disposed intermediate said cap and the head to seal said other end of the head.

5. The improvement as set forth in claim 1 including a chuck mounted within said one end of the hollow rotor for retaining the hollow burr.

6. The improvement as set forth in claim 5 wherein said chuck includes a split sleeve for retaining the hollow burr.

7. The improvement as set forth in claim 1 wherein said conveying means terminates at an opening in the cylindrical wall in proximity to the turbine assembly and directs a flow of air toward the turbine assembly, said conveying means including a groove disposed within the cylindrical wall, said groove extending between said opening and said collection chamber; whereby, a part of the flow of air through said conveying means is directed to said collection chamber through said groove.

8. The improvement as set forth in claim 7 wherein the turbine assembly seals the lateral edges of said groove to maintain the flow of air within said groove.

9. The improvement as set forth in claim 8 wherein said cap is imperforate and includes means for sealing said other end of the head.

10. The improvement as set forth in claim 9 including a chuck within said one end of the hollow rotor for retaining the hollow burr.

11. The improvement as set forth in claim 10 wherein said chuck includes a split sleeve for retaining the hollow burr.

12. The improvements as set forth in claim 11 further including a tool for rotating said chuck while retaining the hollow rotor immobile to release or tighten the grip of said chuck on the hollow burr.

13. The improvements as set forth in claim 12 wherein said tool includes:
 a. a skirt for positioning the tool adjacent the head;
 b. a pin for engagement with the head and the hollow rotor to inhibit rotation therebetween; and
 c. a wrench movably connected to said skirt for engaging and rotating said chuck with respect to the hollow rotor.

* * * * *